Patented Dec. 30, 1930

1,786,528

UNITED STATES PATENT OFFICE

PHILIP H. GROGGINS, OF WASHINGTON, DISTRICT OF COLUMBIA

PROCESS OF PREPARING 4-AMINO-PARA-PHENYL-ORTHO-BENZOYL-BENZOIC ACID

No Drawing.  Application filed August 8, 1929. Serial No. 384,510.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by and for the Government for governmental purposes without payment to me of any royalty thereon.

I have discovered that 4-amino-para-phenyl-ortho-benzoyl-benzoic acid may be obtained by the replacement of the halogen group in 4-halogen-para-phenyl-ortho-benzoyl-benzoic acid by an amino group. The chemical reaction is expressed as follows, wherein (hlg) represents a halogen atom.

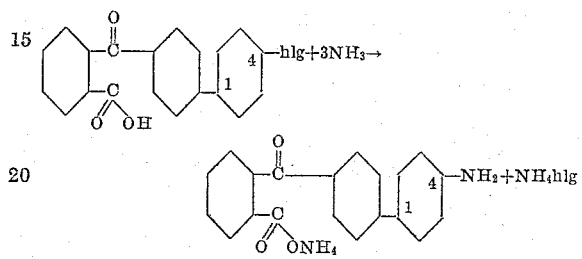

This replacement is accomplished by heating with ammonia under pressure. I have found that copper and its salts may be used as a catalyst to accelerate the reaction.

When in a pure state, 4-amino-para-phenyl-ortho-benzoyl-benzoic acid is a light yellow crystalline substance becoming slightly pink colored on exposure to air. It melts at 280–282° C. It is readily soluble in chlorobenzene and glacial acetic acid. It is only sparingly soluble in benzene, toluene or alcohol. It is readily soluble in boiling dilute acids. With aqueous ammonia or caustic soda solutions the corresponding salts are formed which are moderately soluble in cold water. The ammonium salt obtained from the autoclave is yellow whereas the hydrochloride or sulfate of the amine is orange.

Without limiting my invention to any particular procedure the following examples in which parts by weight are given, illustrate the application of my invention in the preferred form.

*Example I.*—Seventeen parts of 4-(hlg)-para-phenyl-ortho-benzoyl-benzoic acid, or the corresponding weight of ammonium salt, are mixed with 200 parts of 29 per cent ammonia, and .2 part cuprous chloride as catalyst. The mixture is then heated to 210° C. using a pressure autoclave provided with an agitator. The temperature is maintained for 20 hours. The charge is then distilled with steam to remove the ammonia. The ammonium salt is filtered hot and the filtrate acidified with dilute hydrochloric acid to produce the hydrochloride of 4-amino-para-phenyl-ortho-benzoyl-benzoic acid. After warming and filtering, the amino salt is cooled and then made exactly neutral by mixing with dilute bicarbonate solution. The amino keto acid is precipitated as a light yellow flocculent product. The material may be purified by recrystallizing the free acid or sodium salt from hot water. The yield of 4-amino-para-phenyl-ortho-benzoyl-benzoic acid is very high.

*Example II.*—Twenty-five parts of the ammonium salt of 4-(hlg)-para-phenyl-ortho-benzoyl-benzoic acid are treated with 250 parts of 29 per cent ammonia and 0.25 parts of cuprous chloride. The mixture is heated at 200° C. for 20 hours in an agitated autoclave. The excess of ammonia is distilled with steam and the ammonium salt just neutralized with dilute mineral acid. A very fine product with high yield is thus obtained. To further purify, the amino salt is dissolved in a large quantity of boiling water and filtered. After cooling, dilute ammonia is added to just neutralize, and the 4-amino-para-phenyl-ortho-benzoyl-benzoic acid is obtained as a yellow flocculent precipitate of high purity.

*Example III.*—Twenty-five parts of 4-chloro-para-phenyl-ortho-benzoyl-benzoic acid are mixed with 400 parts of 26 per cent ammonia, 0.05 parts of cuprous chloride and 1 part of copper. The charge is heated in an agitated autoclave for 16 hours at 200° C. On cooling the yellow ammonium salt of 4-amino-para-phenyl-ortho-benzoyl-benzoic acid is obtained. When the amino salt is made by treating the precipitate with sulfuric acid, this can be used for the preparation of para-amino-beta-phenyl-anthraquinone.

I am aware that numerous details of the process may be varied through a wide range without departing from the spirit of this invention, and I do not desire limiting the patent granted hereon otherwise than as necessitated by the prior art.

I claim as my invention—

1. The process of preparing 4-amino-para-phenyl-ortho-benzoyl-benzoic acid, which comprises heating 4-halogen-para-phenyl-ortho-benzoyl-benzoic acid with aqueous ammonia under pressure.

2. The process of preparing 4-amino-para-phenyl-ortho-benzoyl-benzoic acid which comprises heating 4-halogen-para-phenyl-ortho-benzoyl-benzoic acid with aqueous ammonia under pressure in the presence of a copper catalyst.

3. The process of preparing 4-amino-para-phenyl-ortho-benzoyl-benzoic acid which comprises heating 4-chloro-para-phenyl-ortho-benzoyl-benzoic with aqueous ammonia in the presence of a copper catalyst, and then precipitating the amino-compound by cooling the ammoniacal solution.

4. As a new article of manufacture 4-amino-para-phenyl-ortho-benzoyl-benzoic acid, having most probably the following chemical formula,

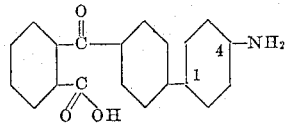

In testimony whereof I have hereunto subscribed my name.

PHILIP H. GROGGINS.